(12) United States Patent
Barham et al.

(10) Patent No.: US 7,284,047 B2
(45) Date of Patent: Oct. 16, 2007

(54) SYSTEM AND METHOD FOR CONTROLLING NETWORK DEMAND VIA CONGESTION PRICING

(75) Inventors: Paul Barham, Cambridge (GB); Richard Black, Cambridge (GB); Peter Key, Hardwick (GB); Neil Stratford, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 10/010,881

(22) Filed: Nov. 8, 2001

(65) Prior Publication Data

US 2003/0097461 A1    May 22, 2003

(51) Int. Cl.
*G06F 15/173* (2006.01)
*G06F 15/16* (2006.01)

(52) U.S. Cl. .............. 709/224; 709/226; 709/227; 709/228; 709/232; 709/233; 370/230.1; 370/232; 370/235

(58) Field of Classification Search .............. 709/223, 709/224, 232–235; 705/30; 370/229, 232–235
See application file for complete search history.

(56) References Cited

U.S. PATENT DOCUMENTS

| | | | | |
|---|---|---|---|---|
| 5,517,622 A | * | 5/1996 | Ivanoff et al. ............... | 709/232 |
| 5,682,477 A | * | 10/1997 | Wakamiya et al. .......... | 709/223 |
| 5,903,735 A | * | 5/1999 | Kidder et al. ................ | 709/240 |
| 5,974,466 A | * | 10/1999 | Mizutani et al. ............ | 709/236 |
| 6,047,322 A | * | 4/2000 | Vaid et al. ................... | 709/224 |
| 6,047,326 A | * | 4/2000 | Kilkki ......................... | 709/228 |
| 6,230,203 B1 | * | 5/2001 | Koperda et al. ............. | 709/229 |
| 6,310,881 B1 | * | 10/2001 | Zikan et al. ................. | 370/401 |
| 6,335,927 B1 | * | 1/2002 | Elliott et al. ................. | 370/352 |
| 6,442,135 B1 | * | 8/2002 | Ofek ........................... | 370/229 |
| 6,483,805 B1 | * | 11/2002 | Davies et al. ............... | 370/235 |
| 6,690,929 B1 | * | 2/2004 | Yeh ............................. | 455/406 |
| 6,728,208 B1 | * | 4/2004 | Puuskari ................... | 370/230.1 |
| 6,738,383 B1 | * | 5/2004 | Kliland et al. .............. | 370/401 |
| 6,742,015 B1 | * | 5/2004 | Bowman-Amuah ......... | 718/101 |
| 6,819,746 B1 | * | 11/2004 | Schneider et al. ........ | 379/29.01 |
| 6,839,340 B1 | * | 1/2005 | Voit et al. .................... | 370/352 |
| 6,909,708 B1 | * | 6/2005 | Krishnaswamy et al. ... | 370/352 |

(Continued)

OTHER PUBLICATIONS

J. K. MacKie-Mason and H. R. Varian. Pricing in the Internet. In B. Kahin and J. Keller, editors, *Public access to the Internet*, Prentice Hall, New Jersey, 1994.

(Continued)

*Primary Examiner*—Jason Cardone
*Assistant Examiner*—Jeffrey R Swearingen
(74) *Attorney, Agent, or Firm*—Workman Nydegger

(57) ABSTRACT

A method and system for avoiding network congestion by measuring network load to adjust a rate at each source. The load (e.g., as a price value) is provided to network traffic sources, which adjust their flows based on a per-flow weight (willingness to pay). The load may be determined in-band by routers or out-of-band by an observer node. A load value (e.g., as a price) is increased or decreased based on the actual load or an estimate based on the actual load. The sources obtain the load value and control the output rates per flow based on each flow's associated weight (willingness to pay), e.g., as set by an administrator. Further, two classes of applications are enabled by allowing certain applications to ignore price.

43 Claims, 9 Drawing Sheets

U.S. PATENT DOCUMENTS 6,910,024 B2 * 6/2005 Krishnamurthy et al. ... 705/400

OTHER PUBLICATIONS

F. P. Kelly, A. K. Maulloo and D.K.H. Tan, Rate Control in Communication Networks: Shadow prices, Proportional Fairness and Stability. In *Journal of the Operational Research Society*, 49:237-252, 1998.

R. J. Gibbens and F.P. Kelly. Resource pricing and the evolution of congestion control. In *Automatica*, 1999.

R. Jain and K.K. Ramakrishnan. Congestion Avoidance in Computer Networks with a Connectionless Network Layer: Concepts, Goals and Methodology. In *Proceedings IEEE Comp. Networking Symposium*, Apr. 1998, pp. 134-143.

S. Floyd. TCP and Explicit Congestion Notification. *In ACM Computer Communications Review*, 24(5):10-23, year needed Oct. 1994.

K. Ramakrishnan and S. Floyd. A Proposal to add Explicit Congestion Notification to IP. IETF RFC 2481, Jan. 1999.

S. Floyd and V. Jacobson. Random Early Detection Gateways for Congestion Avoidance. *In IEEE/ACM Transaction on Networking*, 1(4):397-413. 1993.

R. J. Gibbens and F. P. Kelly. Distributed Connection Acceptance Control for a Connectionless Network. In P.B. Key and D. G. Smith, editors, *Teletraffic Engineering in a Competitive World*, Proceedings ITC16, Elsevier. Jun. 1999.

R. J. Gibbens and P.B. Key. *A Note on Resource Pricing and Congestion Control for Networks with Delay and Loss*. Preprint, 1999.

P.B. Key and D. R. McAuley. Differential QoS and pricing in Networks: Where Flow Control Meets Game Theory. In *IEEE Proceedings Software* 146(2). Mar. 1999.

\* cited by examiner

SYSTEM AND METHOD FOR CONTROLLING NETWORK DEMAND VIA CONGESTION PRICING

FIELD OF THE INVENTION

The present invention is generally directed to computer systems and networks, and more particularly to reducing or eliminating network congestion.

BACKGROUND OF THE INVENTION

Network congestion generally refers to overloading the resources of a network, such as routers and switches, with packets that need to be handled. When network congestion occurs, packets are dropped by an overloaded resource and have to be retransmitted. Numerous methods and proposals for avoiding network congestion are known, but each has its own drawbacks with respect to issues such as fairness, (e.g., which packets get dropped), enforcement, practical implementation difficulties, and so forth.

For example, in the Transmission Control Protocol (TCP), network congestion is controlled via various phases and techniques, including a congestion avoidance phase. TCP controls its transmit rate by a congestion window that determines the maximum amount of data that may be in transit at any time, wherein a congestion window's worth of data is transmitted every round-trip time. In the absence of congestion, TCP increases its congestion window by one packet each round-trip time. To avoid congestion, if the network drops any packet, TCP halves its congestion window. However, detecting congestion through packet loss, typically as a result of overflow in a router's output queue, has a number of drawbacks including that this method is reactive rather than proactive, as by the time the (often substantial) router buffers are filled up and packets start to get dropped, the network is seriously overloaded. Consequently, the "normal" operating state of the network is to have substantial queuing delays in each router. Moreover, only those flows whose packets are dropped are aware of the congestion, which is why TCP needs to back off aggressively and halve the congestion window. The dropped packets often are not from the source that initially caused the congestion.

A more proactive attempt to avoid network congestion based on the above reduce-on-dropped-packets scheme is "Random Early Detection" (RED). RED operates by randomly discarding more and more packets as the network gets more and more congested, whereby the various sources' TCP congestion avoidance mechanisms halve their congestion windows before full congestion occurs. Packets are discarded with a probability computed from many parameters and variables, including the smoothed length of the forwarding queue. This scheme also has its drawbacks, as among other things, packets are unnecessarily dropped before the network is actually full.

A proposed improvement to TCP/IP, known as Explicit Congestion Notification (ECN), would mark the packets (e.g., that would be dropped in RED) instead of actually dropping them. The mark is returned to the source, whereby the source may slow down its rate of transmission. More particularly, ECN would work to signal the onset of congestion by setting a single bit in the IP packet header. To aid incremental deployment in the Internet, ECN aware traffic flows would identify themselves by setting a further bit in the IP header, whereby non-aware flows could have their packets discarded as normal. When received, the destination (TCP sink) sends back these ECN bits to the source (e.g., in an acknowledgement packet, or ACK) as a TCP option, whereby the source reacts to the ECN signals in the same way as TCP reacts to lost packets, for instance, by halving the congestion window on receipt of such a signal.

To implement an ECN scheme, significant complexity is added at the TCP level to ensure that at least one congestion mark on a packet in a round-trip time's worth of packets has the same effect as a packet loss on the congestion window. To this end, and also to handle the case of delayed ACKs, still further complexity is added to allow the source to signal to the destination, using a Congestion Window Reduced flag, when the source had reduced the rate of its transmission to account for the signal received from the destination. Under this scheme, if policing of users is required, routers may need to run additional code to ensure that flows back off correctly. As can be appreciated, ECN thus has a number of drawbacks, including that complexity is added throughout the network, it only works with modified TCP code, and is particularly difficult to enforce, e.g., an uncooperative source can simply ignore the notification to get more than its fair share of network resources.

Many researchers and implementers have gone to great lengths to ensure that TCP shares out bandwidth fairly among a number of flows sharing a bottleneck. This requires that flows have the same response to congestion events and the same aggressiveness when increasing their bandwidth. In any real network, however, this is not assured, since any unresponsive traffic flows, such as UDP or IP-multicast, will capture the bandwidth they wish from the responsive flows. Also, any user (or web browser) that opens multiple TCP connections will gain a greater share of the bandwidth. Moreover, the network is unable to tell the difference, for example, between a web browser using two TCP connections to fetch the same page, a user using two browsers to fetch two distinct pages, and two users on the same machine (e.g., a terminal server) each fetching a single page with a single browser.

An inherent problem is that traffic sources currently have little incentive to reduce their offered load when faced with congestion, since there is no generic means to detect those sources that do not comply and/or to associate the complying TCP sources with users. There are currently no practical mechanisms for enforcing TCP-compliant behavior.

As an alternative to the above models, theorists have suggested congestion pricing as a possible solution to network congestion problems. In essence, these congestion pricing theories suggest that each router in the network should charge all sources responsible for network congestion, (e.g., by an in-band marking of their packets). Then, in the acknowledgement from the destination or by some other means, each source is notified of the total congestion caused, such that sources will voluntarily reduce their transmit rates based on their "willingness to pay". However, while such schemes can be shown to have many desirable mathematical properties, they suffer from practical problems, including that the packets initially responsible for creating the load that contributes to subsequent congestion of the network may be forwarded without being marked. Moreover, these models assume that charges can be added to a packet as each resource in the network gets used, which may not be feasible when the congested resource is not easily programmable, such as an existing router that cannot realistically be accessed, or is not programmable at all.

SUMMARY OF THE INVENTION

Briefly, the present invention provides a method and system for reducing network congestion, essentially by combining aspects of congestion notification and congestion pricing. For example, congestion pricing triggers the sender into reducing transmit rates. In general, each flow's bottleneck is deliberately moved into the source, such as into its operating system, thereby reducing queuing and latency in the network itself. A cooperative distributed algorithm is used to adjust these artificial bottlenecks so as to proportionally share bandwidth according to a globally consistent policy. Significantly, the network runs in a less congested state, and enables proportional sharing of bandwidth. Congestion is avoided by the use of continuous feedback, rather than by providing notification once congestion had occurred. The present invention also facilitates the use of heterogeneous protocols.

In one implementation, each flow (which may be anything from a single TCP connection to a large aggregate) is assigned a weight. The source operating system introduces an artificial bottleneck for the flow, e.g., using a token-bucket shaper with a sustained rate. Routers on the path taken by the flow maintain and advertise a path load estimate. End-systems voluntarily adjust the artificial bottleneck such that the rate equals the weight divided by the load estimate. The load estimate is adjusted (e.g., relatively slowly) up or down by routers such that the aggregate arrival rate matches a target utilization of the bottleneck link. Setting the target utilization to something less than full utilization (e.g., ninety percent) has been found to dramatically reduce the mean queue length.

To accomplish this implementation, packets may carry two additional fields, referred to herein as LOAD and RLOAD. As outbound packets pass through routers, the aggregate demand for resources on its route is accumulated in the LOAD field. When a packet reaches its destination, this information is recorded and periodically returned to the source in the RLOAD field of any packet traveling in the opposite direction, (which is not necessarily a symmetric route). For example, the RLOAD message may be included in the next IP packet going from the destination to the source (e.g. a TCP ACK segment), but it may alternatively be conveyed in a separate packet if the flow has no back-channel. When received, the source system adjusts the sustained token rate of the token-bucket shaper according to the incoming load notification messages and the flow weight parameter. Avoidance is thus achieved according to the cooperative distributed algorithm. Note that the present invention generally requires that the source of the flows will cooperate. The present invention therefore may be more appropriate for a corporate intranet or home network where enforcement of the cooperation is more feasible. Nevertheless, given a suitable incentive or enforcement technique, the present invention is applicable to the Internet as a whole.

In an alternative implementation, instead of relying on the network resources (routers) to accumulate data in selected packets, the present invention uses information aggregated out-of-band, such as measured network load, to establish a price (or the like). The current price information is then sent back to the packet sources where those sources adjust their transmit rates based on their willingness (actually an ability value, set by an administrator or the like) to pay. Note that the price and/or willingness values need not be in actual monetary amounts, but for example, can be based on any system of credits or the like. As a result, all packets factor into the price, not just those arriving when congested. Fairness is provided by having the transmit rates controlled according to the willingness settings, enforced at a level (e.g., in the operating system) that ensures compliance.

In one example of this alternative implementation, a small broadcast network such as a home network has one of its connected computing devices (an observer node) observe and measure the load on the network at regular intervals (e.g., ten times per second). To this end, the observer node runs in a mode that receives all network packets. The observer node counts the total number of bytes (number of packets and their size) received in each sampling interval, and calculates the current network load based on the accumulated total versus the network capacity, which is known or otherwise determinable.

For example, the network capacity can equal the current capacity of the communications medium and the like that limits the bandwidth. A price is then set based on a relationship between a load and the capacity. In this example implementation, the observer node adjusts a price based on the current load information and the capacity, such that the price increases from its previous level if network load exceeds a threshold level, such as eighty percent of capacity, and decreases from its previous level if the price is below the threshold. The rate of price increase need not be the same as the rate of price decrease, and the increase, decrease and threshold can be varied for given network conditions. Moreover, if thresholds are used to control rates, one threshold may be used for increasing price and another for decreasing.

Once calculated, the observer node communicates (e.g. broadcasts) the current price to the other nodes on the network. Then, when received, the output rates of various sources (e.g., per application or executable code component on each machine) can be adjusted as necessary based on the received price versus each application's willingness to pay for that given instance of communication. The adjustment is applied so that the rate tends towards the willingness to pay divided by the current price or a similar formula. For example, this rate adjustment could be applied immediately, or by a differential equation which introduces damping. This avoids congestion in a manner that is controlled according to the desire of an administrator (or the like), such that ordinarily more important and/or more bandwidth-sensitive applications (or communication instances within a given application) will receive more bandwidth than less important or sensitive applications based on the willingness to pay. By incorporating the present invention into each machine's operating system at the appropriate levels, existing applications can be controlled without modifying them, any protocol can be controlled, and non-privileged users will not be able to change the settings.

As an added benefit, the present invention provides for distinct types of classes, or priority levels, by allowing certain applications to ignore price, essentially giving them infinite willingness to pay. As long as the total bandwidth used by any such applications stays below the network capacity (preferably the threshold percentage), the needed bandwidth will be available for the application or applications and no packets will be lost. For example, a DVD movie played on a home network, which would be sensitive to lost packets or reductions in transmission rate, typically would be allowed to send packets regardless of the current price. Other applications that can have their transmit rates varied according to the price will, in essence, have the remaining bandwidth divided up based on their willingness to pay settings. In effect, because the preferred class ignores price, the non-preferred class has reduced capacity available thereto.

Other objects and advantages will become apparent from the following detailed description when taken in conjunction with the drawings, in which:

DETAILED DESCRIPTION

Exemplary Operating Environment

Figure 1:
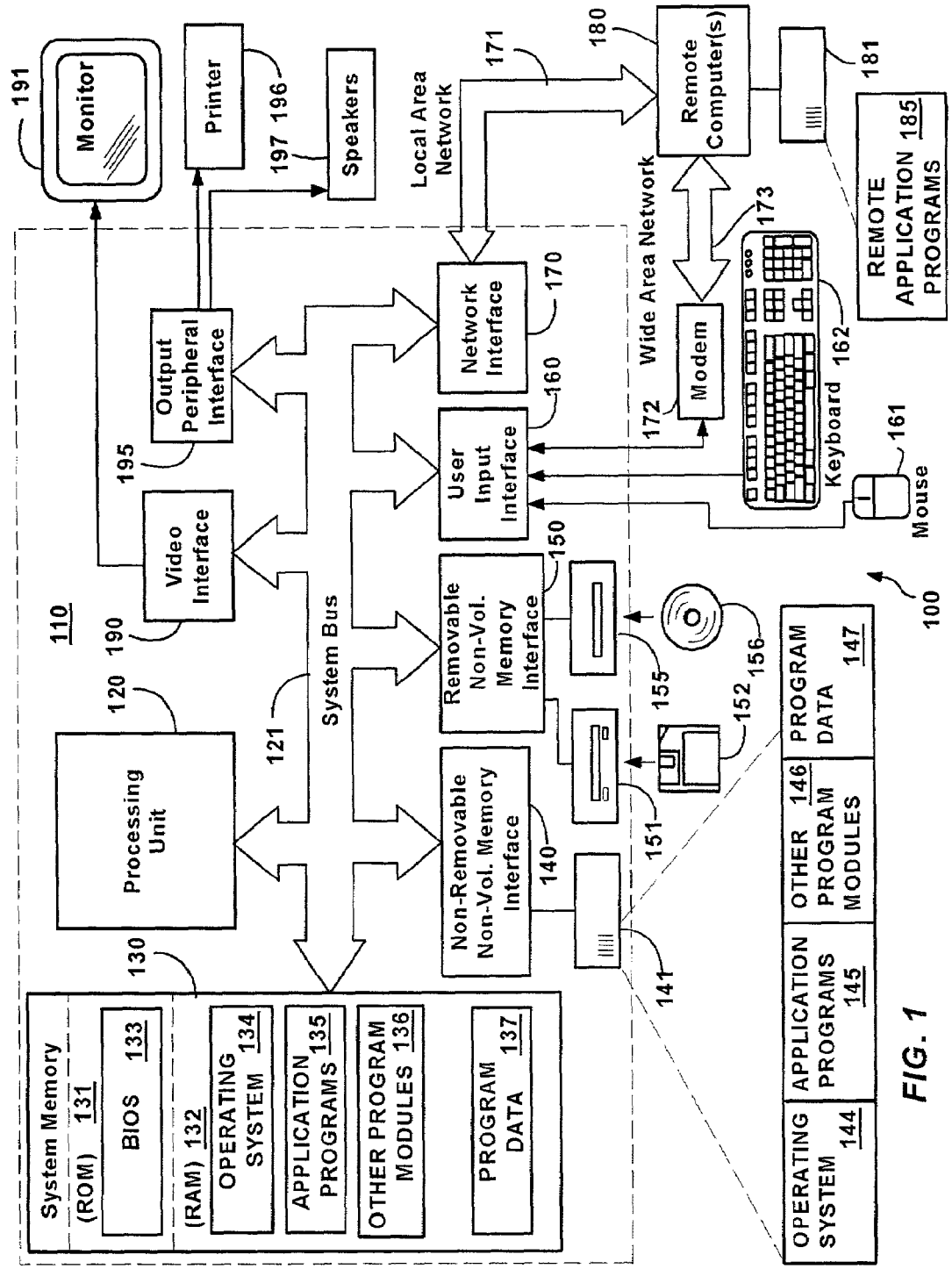
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface (e.g., hard disk controller) 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Avoiding Network Congestion

In general, instead of having flows aggregate into bottlenecks on the network, each flow's bottleneck is deliberately moved into the source (such as into its operating system) as an artificial bottleneck, thereby reducing queuing and latency in the network itself. In each source, a cooperative distributed algorithm is used to adjust these artificial bottlenecks based on network load so as to proportionally share bandwidth according to a globally consistent policy. Congestion is avoided by use of continuous feedback, rather than provide notification once congestion had occurred. Significantly, because the flows are held up in each source as needed to avoid congesting the network, the network runs in a less congested state. The present invention also facilitates the use of heterogeneous protocols. Note that the present invention allows existing protocols to use their own short-timescale congestion avoidance mechanisms, (e.g., TCP's AIMD mechanism, or RTP for streaming media).

Figure 2:
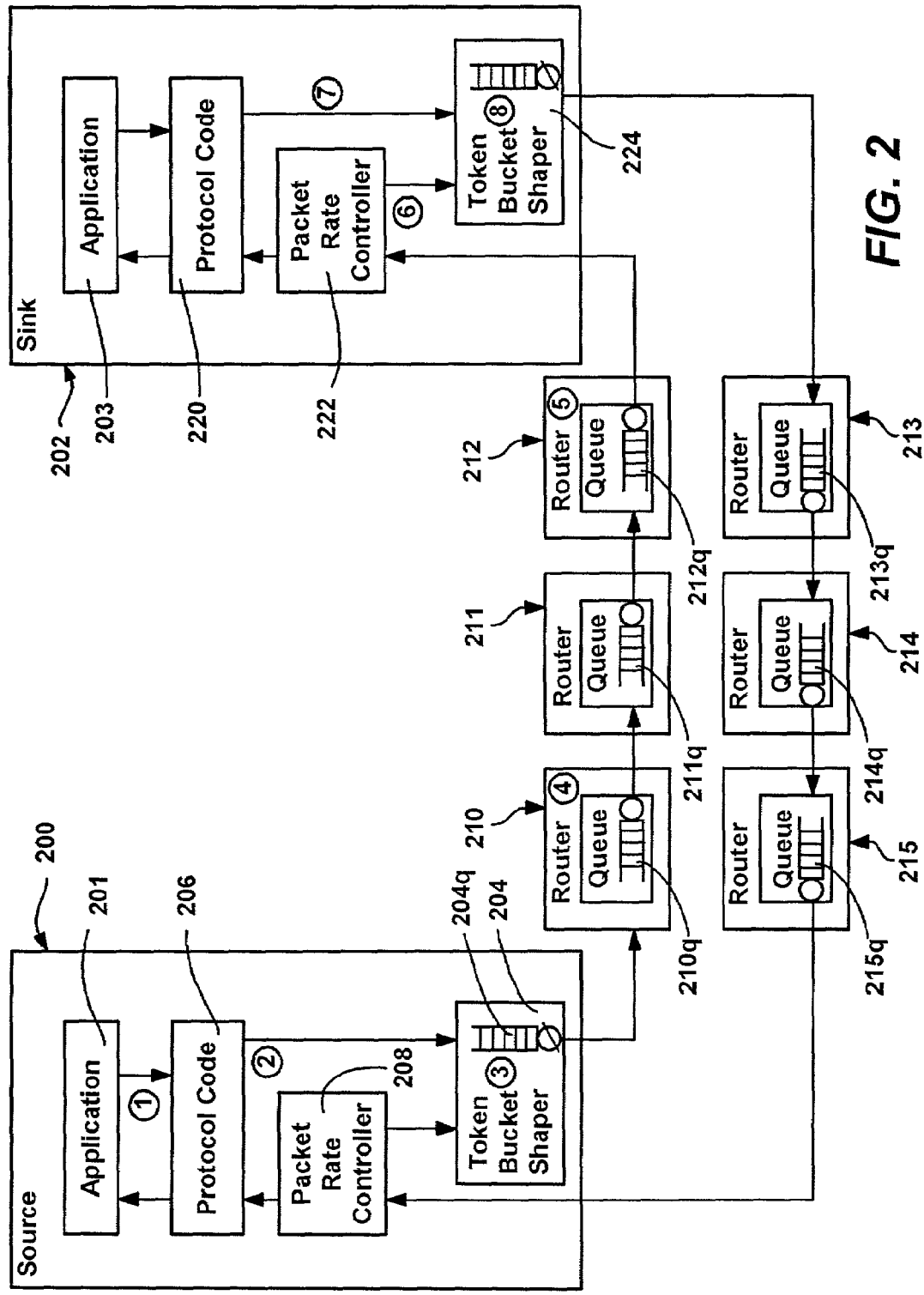
FIG. 2 is a block diagram generally representing transmission of a packet through a computer network into which the present invention is incorporated.

FIG. 2 provides an example that demonstrates the operation of certain main components involved in packetized data transmission using congestion avoidance in accordance with one aspect of the present invention. In FIG. 2, a source 200 such as a client computing device sends a packet to a sink (destination node) 202, such as a server computing device, such as via the TCP/IP protocol. Note that for simplicity, in FIG. 2, objects representing transmission links and those required for maintaining routing information and demultiplexing incoming packets are not shown. Further, note that FIG. 2 does not distinguish between the TCP-level and the IP-level as in a real network protocol stack, however it is understood that the code that handles IP-level functionality may be extended to implement the present invention.

In accordance with one aspect of the present invention, a congestion notification and pricing protocol is provided, along with components for implementing the willingness to pay (WTP) protocol. These components implement the majority of the cooperative distributed algorithm at the end-systems to perform congestion avoidance algorithm. In general, as shown in FIG. 2, the transmit rate of the flow is regulated using a token bucket shaper 204, whose token rate is adjusted upon receipt of explicit notifications of network load.

More particularly, to use the WTP protocol, hosts install a packet shaper for each flow, i.e., the token bucket shaper herein. In general and as described below, the sustained token rate of this shaper is adjusted according to incoming load notification messages and a flow weight parameter for the flow. The size of the token bucket is chosen to allow bursts of up to certain maximum size, whereby, for example, mechanisms such as TCP may start slowly and rapidly find an operating point. This also benefits interactive response for short lived or bursty flows.

In one implementation, whenever an instance of protocol communication 206 (such as a web connection) is created by an application 201 in the source 200, the WTP token bucket shaper 204 is interposed between the protocol 206 and the network interface of the source 200. Note that in an actual protocol stack, the token bucket shaper code could be installed between the bottom of the IP layer and the network interface device driver, within the IP layer, or elsewhere. The token bucket shaper 204 regulates the flow based on network load according to network load information obtained via return packets transmitted to the source 200, (e.g., a TCP ACK packet). For example, with each flow (which may be anything from a single TCP connection to a large aggregate) a weight may be associated, such as based on a willingness to pay value relative to the load estimate (price). Using the weight and load, the source operating system introduces an artificial bottleneck for the flow, e.g., by using a token-bucket shaper with a sustained rate. As described below, routers on the path taken by the flow maintain and advertise a path load estimate, and end-systems adjust the artificial bottleneck such that the rate equals the weight divided by the load (or other suitable formula). In general, the rates of the flows have beneficial overall effects on the network and the applications. For example, when the network is an Ethernet network, the weights for each flow may be set throughout a network's sources such that the sum of the rates of the flows approaches a target utilization value, as described below.

As represented in FIG. 2, the feedback loop works when the protocol code 206 decides to transmit a segment on behalf of data given it by application 201. In FIG. 2, this is generally represented by the circular labels one (1) and two (2). The protocol code 206 would normally transmit the data on the outgoing link, but in keeping with the present invention, instead passes the data to the token bucket shaper 204. In turn, the token bucket shaper 204 determines (schedules) the transmit time of the packet. As described below, if necessary based on network load information, the packet is enqueued, e.g., in a queue 204$q$ within or otherwise associated with the token bucket shaper 204. This is generally represented in FIG. 2 by the circular label three (3).

At the appropriate time, the token bucket shaper 204 sends the packet on the outgoing link, whereby the packet passes through the network and reaches the output queue 210$q$ of a router 210. Three routers 210-212 are shown in FIG. 2 as being present on the source to sink path for this particular packet, but as can be readily appreciated, any number of routers and/or other network devices (e.g., switches) may be present in the path. Note that these routers 210-212 may be the same as the routers on the path back to the source, or may be different routers (e.g., 213-215).

To provide load information, packets may carry two additional fields, referred to herein as LOAD and RLOAD. In general, as outbound packets pass through routers, the aggregate demand for resources on its route is accumulated in the LOAD field. When a packet reaches its destination, this information is recorded and returned (e.g., periodically, intermittently or even continuously) to the source in the RLOAD field of an appropriate packet traveling in the opposite direction (which is not necessarily a symmetric route). For example, the RLOAD message may be placed in the next IP packet going from the destination to the source (e.g. a TCP ACK segment), but it may also be conveyed via a separate packet if the flow has no back-channel. Also, it is feasible for the routers themselves to provide the load value information back to the source.

It should be noted that outgoing packets accumulate some information that allows the LOAD to be deduced, whether a single bit or a floating point number. The routers may even generate additional packets to the destination or source. Further, the return path (RLOAD) may be provided completely out of band, i.e. by periodically generating additional packets from destination to source, or using an IP option added to existing packets, (e.g. ACKs). As before, the amount of information sent back per-packet can vary.

To accumulate the load in the routers, the routers maintain a long-term load estimate, and modify the LOAD headers of the forwarded packets. To this end, routers are provided with a scheme to estimate the longer term aggregate demand for each shared resource. For example, one way in which this may be accomplished is to run a software virtual queue having a service rate equal to a target utilization (e.g. ninety percent of the real line rate) and adjust a load estimate up or down based on whether this queue is full or empty.

For example, in one implementation, to estimate the load, an algorithm computes the arrival rate into the queue in 100 ms time intervals, and compares this to the target utilization, chosen in one implementation to be ninety percent of the outgoing link capacity. The estimated load is increased if the packet arrivals cause this threshold value to be exceeded, or decreased otherwise. For example, to increase the estimated load, the current load estimate may be multiplied by a factor greater than one such as 1.05, while to decrease, the load may be multiplied by 0.99. Of course, virtually any suitable algorithm may be employed, using many suitable formulas and/or appropriate values for those formulas (such as factors and/or thresholds). Note that the above example values are asymmetric, which provides a quick reaction to sudden increases in load relative to more gradual decreases.

Returning to FIG. 2, once calculated, the router's current load estimate is stamped into the IP header, shown in FIG. 2 by the circular label four (4). Any subsequent router may increase the value in the IP header, such as represented by the circular label five (5) in the router 212.

In this manner, as a packet containing a LOAD field passes through the network, it accumulates a total LOAD for all the routers on its path. At each router, incoming packets already contain a load estimate for the path so far, which is combined in some fashion with the load estimate for the current hop. In keeping with the present invention, the function used for combining these values may be determined by desired fairness properties. For example, adding the two values will weight flows based on the total amount of congestion they contribute towards (which will tend to increase with the number of hops), whereas taking the maximum of the two values will share bandwidth proportionally between flows with a common bottleneck.

When the packet reaches the sink (destination node) 202, the packet would normally be delivered to the protocol code 220 for receipt by an application 203. In one implementation of the present invention, an additional packet rate controller component 222 is arranged in order to observe the LOAD and RLOAD fields of the incoming packet, which can be by accomplished by intercepting the packet delivery to component 220, by obtaining a copy of the packet, and/or various other means. The packet rate controller 226 provides the LOAD information received to the token bucket shaper 224. In FIG. 2 this is generally represented by the circular label six (6). It should be noted that in a protocol stack implementation, the protocol code 220 could be implemented in conjunction with the IP protocol or otherwise in such a way, whereby the TCP (or UDP) layer would not need to be involved. The incoming packet may also trigger the protocol code 220 to generate a TCP ACK segment.

In the example shown in FIG. 2, an ACK segment is generated (generally represented in FIG. 2 by the circular label seven (7)) and experiences a symmetric transmit path to that described above. As the ACK leaves the queue in its token bucket shaper 224, the second field in the IP header (RLOAD) is stamped with the most recent load estimate recorded by the packet rate controller 222, referred to as the reflected load estimate. This process is generally represented in FIG. 2 by the circular label eight (8).

On receipt of this ACK packet at source 200, the packet rate controller 208 obtains the reflected load estimate in a similar manner to that used by packet rate controller 222 described above, and notifies the token bucket shaper 204 to update the token rate for this flow.

As can readily be appreciated, for reasons of clarity, the description above explains the process for a simplex flow of data from source to sink. In practice, data flows in both directions and each component acts in the dual of the roles described for source and sink herein. Thus, in general, the token bucket reacts to the network load accumulated in-band to artificially restrict the source flow as needed in accordance with a weight (e.g., willingness to pay) for that flow and thereby avoid congesting the network. Since the present invention helps to avoid queuing in the network, round-trip times are very close to the propagation delay of the network, and hence HTTP responsiveness is greatly improved.

An interesting side-effect of this cooperative scheme for reducing network load is that any unmanaged traffic flow will push all other traffic out of the way. This property can be exploited to provide a high-priority traffic class for some flows, provided that their total peak rate is lower than the capacity of the network. If necessary, this can be arranged by the use of admission control. The use of such a high-priority traffic class is described in more detail below.

In the detailed description of FIG. 2 above, the present invention was described in an example environment (though without limitation) in which routers and end-systems involved in a connection were equipped with an implementation of the present invention. In accordance with another aspect of the present invention, congestion control is provided in an environment in which only the receiving end of the communication is equipped with an implementation of the current invention. In such a situation (an example of which is described later with reference to FIG. 3B) the rate control is performed by controlling the rate at which received packets are acknowledged, essentially creating an artificial bottleneck in the receiver rather than congesting queues at the sender. This provides substantial benefits with Internet Service Providers (ISPs), particularly over slower, dial-up links. Note that the bottleneck in the receiver is from the perspective of the sender, as the receiving end-system can process received packets without delay, with only the ACKs being sent back to the sender being paced at a controlled rate consistent with the rate at which ACKs would be sent if the data were passing through an artificial bottleneck at a controlled rate determined by the congestion pricing aspects of the current invention. This logically moves the bottleneck from the sender's control (e.g., the ISP head-end) to the receiver.

In the present invention, the rate-controlling of ACKs is based on the network load versus the stream's ability to pay. When congested, the receiver thus reduces its rate of acknowledging packets, which causes the sender to adjust its timing of sending more packets to the receiver. This approach is efficacious because of TCP's self-clocking behavior; the rate at which the source sends new data will become the rate at which ACKs are shaped. The sender is thus indirectly rate controlled, without requiring any special rate controlling software at the sender; note that the receiver knows and applies the willingness to pay of the stream in this case, and (indirectly) causes the source's rate to be adjusted by the willingness to pay and the network congestion, even though the source has neither knowledge nor implementation of this present invention.

Controlling Network Congestion via Network Load Pricing

In accordance with another aspect of the present invention, an alternative implementation is generally directed to measuring the demand (a network load) on a network in an out-of-band manner and then using the measured demand to regulate flows. One practical way in which this has been implemented is to determine a price for congestion pricing based on the load. In turn, the price is communicated (e.g., broadcast) to computing devices that each control the rate that its applications' (or other executable codes') packets are sent on the network, based on the received price and each application's ability, i.e., willingness, to pay. The willingness value may be set by an administrator or the like, and may be per application, per computing device or some combination thereof. For example, each application on the network may be given a willingness value, or each computing device may be given a willingness value that it divides among its applications. Many other combinations are possible, e.g., some applications get their own willingness values regardless of the computing devices on which they are run, while other applications divide the remainder based on their respective computing device's allocation.

Note that the term "application" is used for simplicity therein, but is intended to be equivalent to any executable code that may wish to communicate information on the network, (including examples such as an operating system component or the like, whether or not the executable code is typically thought of as an application). Further, such an application/flow may have many different instances of communication, each of which may require different quality of service or special treatment from a network.

Figure 3A:
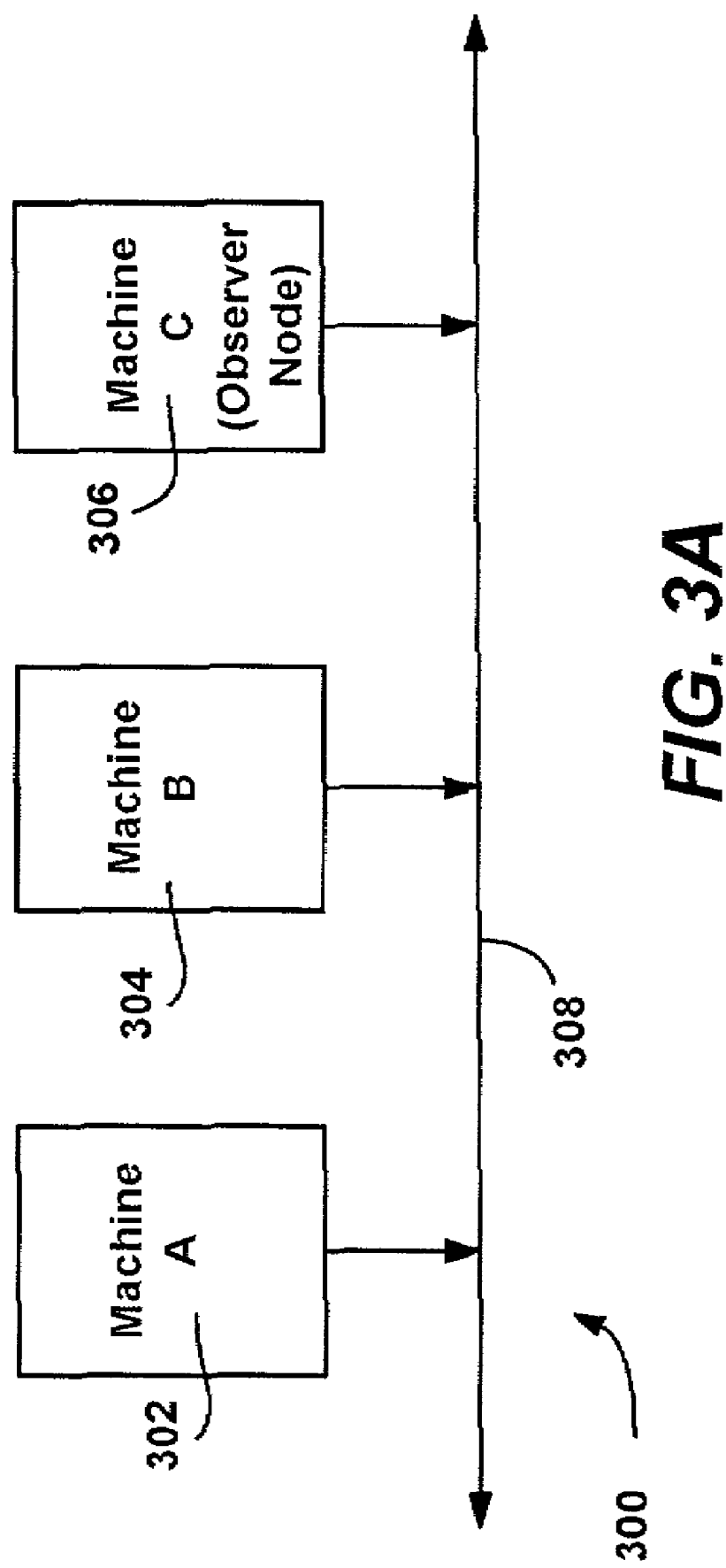
FIGS. 3A and 3B are a block diagram generally representing computer networks into which the present invention may be incorporated.

The system and method are proactive, in that the price will lower the transmit rates before the network is fully congested. Note that while the term "price" is used herein as the basis for controlling network congestion, it is not necessarily monetary in nature, but can, for example, be based on any system of credits or the like. Moreover, although the drawings and the description herein generally refers to application programs that have their transmit rates controlled according to price and their willingness to pay, it is understood that other components that are not applications (e.g., a browser component integrated into an operating system) are capable of having their transmission rates controlled in accordance with the present invention. As such, it should be understood that any executable code capable of causing data to be output on a network is considered equivalent to an application for purposes of this description. In one implementation, the present invention operates in a small network 300 such as shown in FIG. 3A. The network 300 may be a home network, with multiple computing devices (e.g., Machine A 302, Machine B 304 and Machine C 306) connected on a communications medium 308. The communications medium and network interface generally limits the available bandwidth, e.g., ten million bits per second (10 Mbps) Ethernet, that is, the network capacity is ordinarily a fixed value. As will be understood, however, the present invention will work with a variable capacity network (e.g., a wireless network that varies capacity according to noise) as long as a network capacity at any given time can be determined. Machine C 306 acts as the observer node in this network. The operation of the observer node is described below.

Figure 3B:
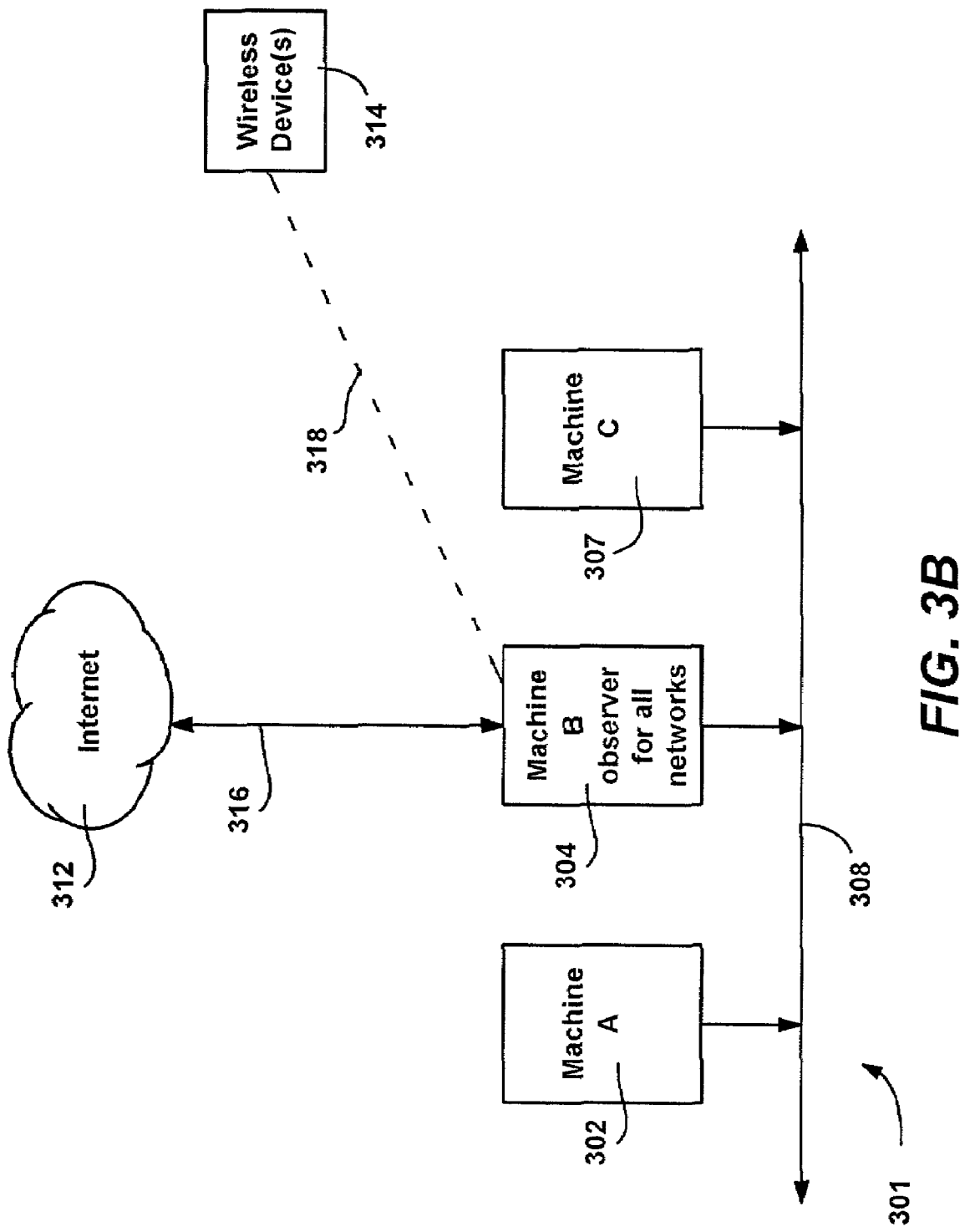

In an alternative implementation, generally represented in FIG. 3B as the (e.g., home) network 301, the network 301 may also include a connection 316 (such as via dial-up, Digital Subscriber Line, or another type of connection) to the Internet 312, and/or a wireless network 318 for connecting to wireless devices 314. As represented in FIG. 3B, the machine B (305) is connected to the Internet connection 316 and hence is acting as the Internet gateway for this home network. In this implementation the home gateway 305 is also connected to the wireless network 318. In accordance with one aspect of the present invention, the home gateway machine 305 acts as an observer for the three networks, 308, 316 and 318, and provides the pricing information to the other devices, e.g. 302, 307, and 314. As can readily be appreciated, although any device on each network may measure and advertise the pricing information, there may be certain advantages (e.g., similar to economies of scale) associated with commonly locating the observers for multiple network links on one device.

Figure 4:
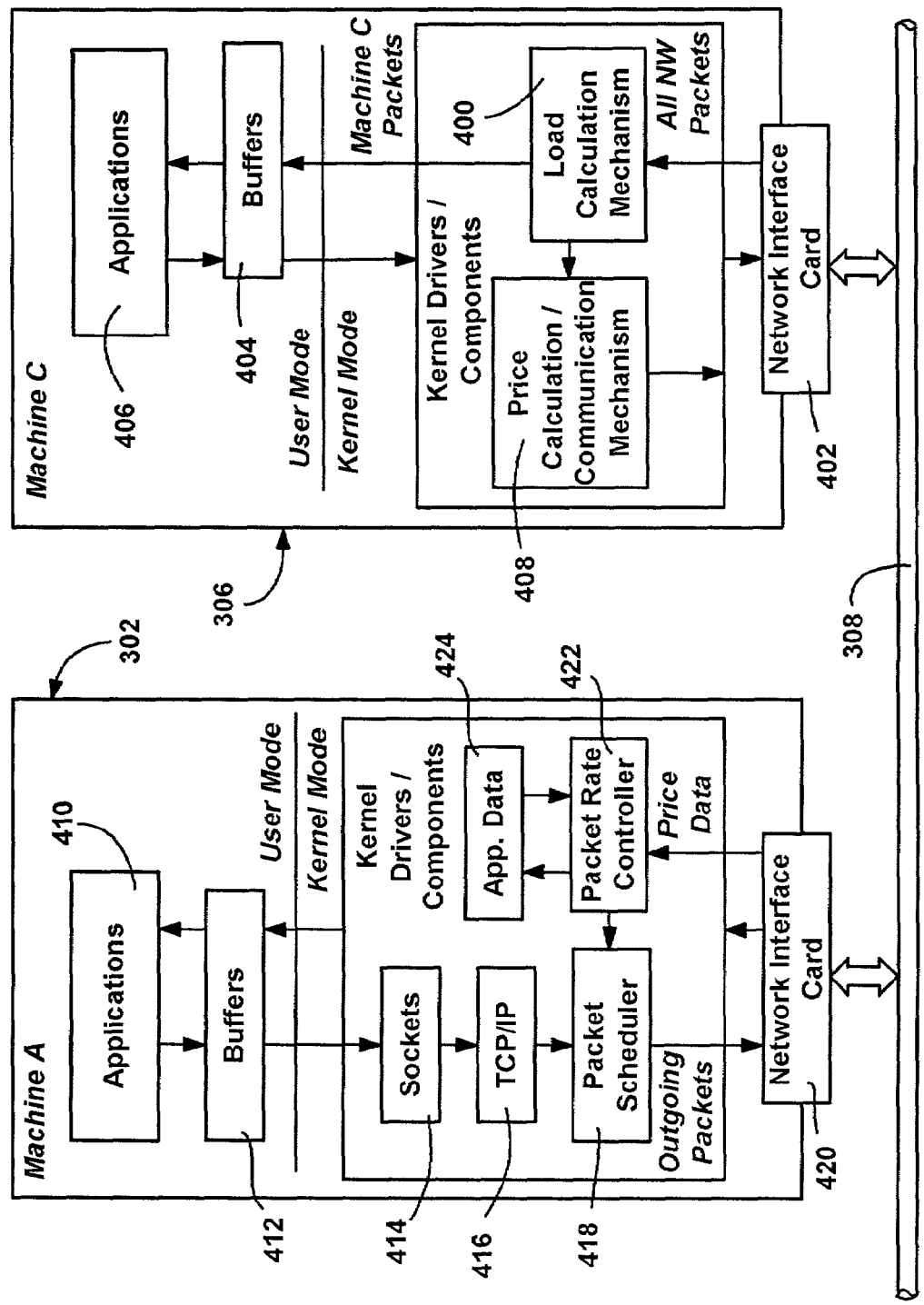
FIG. 4 is a block diagram generally representing example components in network computing devices for providing a price and controlling congestion based on the price in accordance with an aspect of the present invention.

In accordance with one aspect of the present invention, as generally represented in FIG. 4, one of the computing devices (Machine C) 306 acts as an observer node, and includes a load calculation mechanism 400 that totals up the number of bytes being transmitted on the network 300 in a given time interval, such as once every 0.1 seconds. To this end, the observer node 306 runs in a mode (promiscuous mode) that receives all network packets via its network interface card 402, and sums up the packet sizes to determine the actual current load, i.e., the amount of data being transmitted per time interval.

As is understood, with other types of networks, it may be necessary to factor in the per-packet overheads due to the Media Access Protocol of the underlying network, e.g. 802.11, and it may also be necessary to take into account noise and other factors which tend to reduce the available capacity of the channel. Indeed, when dealing with wireless networks, nodes on the network may have different effective operating speeds due to a deliberate backing-off that occurs when noise exists, such as when the node's physical distance from the network increases. For example, when a node sends 100 bytes at a rate of 5½ mbps instead of at 11 mbps, for correctness the node needs to be charged as if it sent 200 bytes, since the node still used the entire channel for a time period in which a full rate node could have sent 200 bytes. To this end, in the wireless implementation, an observer node receives not only the amount of network bandwidth used by a node, but also the operating rate at which it was used, which each node transmits. In this manner, the effective network load used by each given node can be calculated.

Returning to FIG. 3A, for example, note that the observer node 306 may also operate as a regular network computing device, for example, as packets directed to machine C from other nodes may be buffered in buffers 404 for use by applications 406, and those applications 406 can also output network traffic. The packet rates of such applications 406 may be controlled by the process of FIG. 6, (described below), or alternatively by an optimization that uses direct local communication. In a somewhat larger network, the observer node may be a dedicated device for measuring load and communicating the price.

Once the current load is determined, the load calculation mechanism 400 provides the load data to a price calculation/communication mechanism 408, and then restarts the count for the next time interval. The load data may be provided by the load calculation mechanism 400 as a parameter in a call, or may be polled for by the price calculation/communication mechanism 408. Alternatively, the load calculation mechanism 400 and price calculation/communication mechanism 408 may be a single component, in which event the price calculation mechanism directly knows the load data.

In accordance with another aspect of the present invention, once the load data is known, the price calculation/communication mechanism 408 computes a new price based on the previous price and current load information, and then communicates (e.g., broadcasts via a UDP message) the price information to other computing devices 302, 304 on the network. In general, if the load exceeds a certain threshold percentage of the known network capacity, e.g., the network capacity of the communications medium 308 that limits the bandwidth, the price increases. Conversely, if measured load is below the threshold, the price is decreased. In one preferred embodiment, the use of a threshold load (e.g., eighty percent of capacity) makes the system proactive, as the price will start to increase before the network has reached full capacity. The eighty percent threshold value was selected because collisions and the like tend to adversely impact traffic when the network load is above that level. Note that the price may start essentially anywhere, as it will move towards a value that will avoid network congestion, however selecting too low an initial price may cause packets to be dropped until the price increases sufficiently to regulate network traffic. Conversely, too high an initial price will unnecessarily limit the transmit rates of applications until the price drops to the actual load-based value.

As also shown in FIG. 4, one or more applications 410 running on the computing devices of the network (e.g., Machine A 302) may be placing data for transmission over the network into buffers 412, expecting kernel mode components to transmit the data onto the network when appropriate. Such kernel components typically include a sockets driver 414, an appropriate protocol driver (e.g., TCP/IP driver 416), and a packet scheduler 418. Note that any other protocol or protocols may be used. In any event, the packet scheduler 418 is capable of pacing the transmission of traffic according to various criteria. Note that the packet rate controller 422 and packet scheduler 418 components can be similar to those of the source described above with respect to FIG. 2.

In accordance with one aspect of the present invention, the price data received is used to control the rate that applications can transmit data based on their willingness to pay values. To this end, for example, the computing device 302 identified as machine A receives the price data via its network interface card 420 at a packet rate controller 422. Based on application willingness data 424 maintained on the system, e.g., set by an administrator, the packet rate controller 422 notifies the packet scheduler 418 as to how to schedule each application's packets. The price adjustment is applied so that the rate tends towards the willingness to pay divided by the current price or a similar formula. For example, this rate adjustment could be applied immediately, or by a differential equation which introduced damping. By incorporating the present invention into each machine's operating system at the appropriate levels, existing applications (or communication instances thereof) can be controlled without modifying them, any protocol can be controlled, and non-privileged users will not be able to change the settings.

Figure 5:
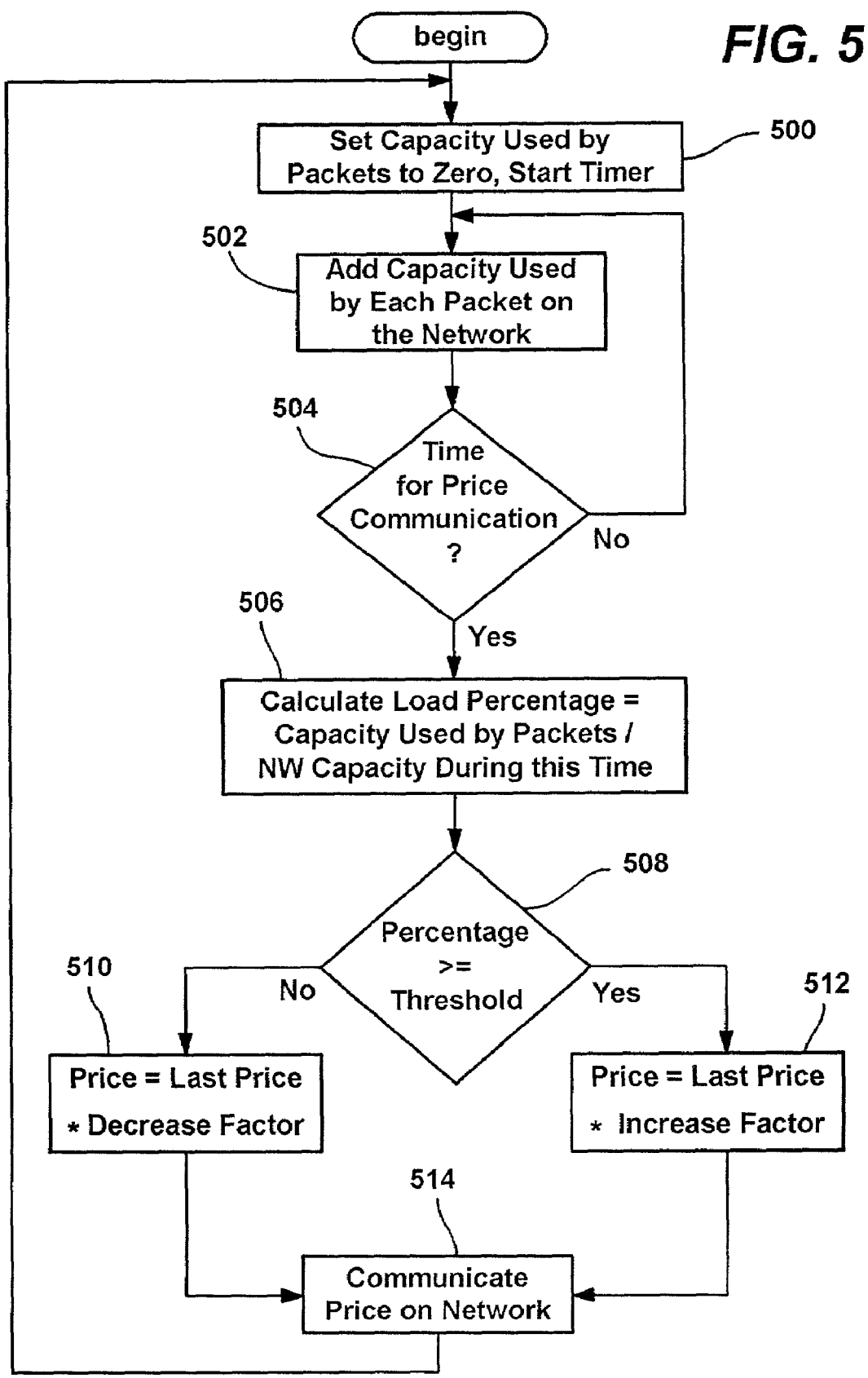
FIG. 5 is a flow diagram generally representing example steps for determining and providing a price based on actual network load versus network capacity in accordance with an aspect of the present invention.

FIG. 5 shows an example process for calculating the current price based on the current network load. To this end, when the to process begins, step 500 sets a variable or the like used to track the capacity used by packets to zero, and starts a timer or the like that determines the current interval time (e.g., 0.1 seconds) during which the network load will be calculated. For example, in an Ethernet network, a total packet size may be used to track the capacity used by packets, wherein step 500 would initialize the total packet size to zero. Note that wireless packets have significant per-packet overheads which are taken into account in the measuring. Step 502 begins summing the used capacity (e.g., the packet sizes in Ethernet networks) on the network 300 for the network packets that are transmitted on the network, as described above. For example, if a packet is N bytes in size, N will be added to the total number of bytes transmitted during this particular interval. Step 504 represents a determination of whether it is time to communicate the price. If not, summing continues at step 502 until the sampling time is achieved. Note that although a loop is shown in FIG. 5, the process may be event driven, e.g., the packets can be counted and summed via a separate process or thread, and the other steps of FIG. 5 started by an event regularly triggered according to a timer, e.g., ten times per second (i.e., once every 0.1 seconds). Step 506 represents one way to calculate the load, i.e., as a percentage equal to the capacity used by the packets divided by the network capacity during this time interval. For example, in an Ethernet network where capacity is essentially fixed, (e.g., 10 Mbps), the percentage can be calculated by dividing the amount of packet data on the network during this time period, i.e. the sum per time, by the network capacity per unit time. In a wireless network, the network capacity may be variable, however the network capacity in a given interval can be measured.

In keeping with the present invention, when the load percentage is greater than or equal to a threshold percentage value, such as eighty percent of the network capacity, the price will be increased. If not, the price will be decreased. Note that if a threshold scheme such one similar to that described herein is used, one threshold may be used for increasing price and another for decreasing price (e.g., increase price if greater than eighty percent, but only decrease if the percentage falls below seventy percent). Step 508 represents a single threshold comparison, which branches to step 510 to decrease the price if the measured load is below the threshold percentage value, or to step 512 if greater than or equal to the threshold percentage value.

Figure 6:
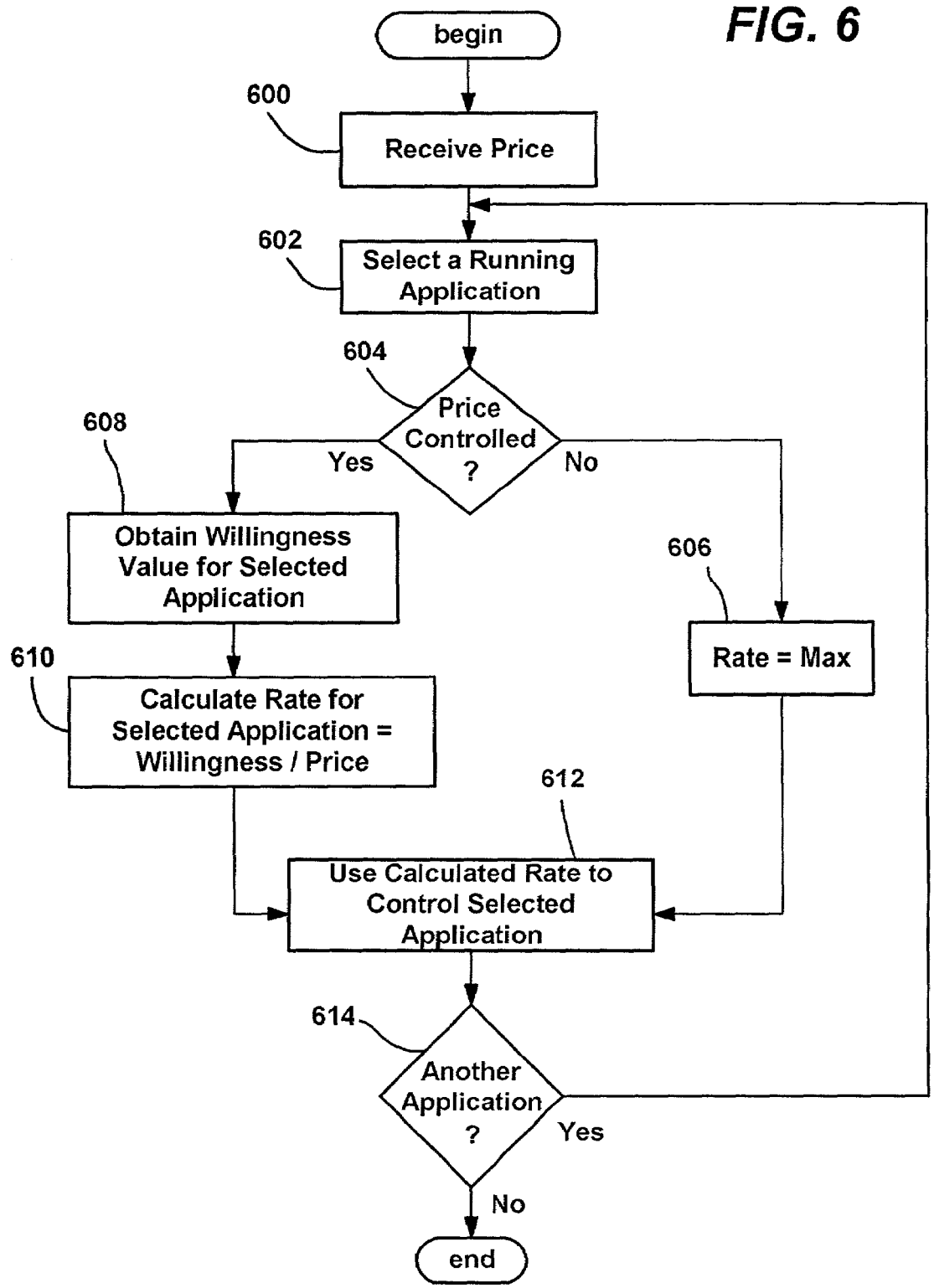
FIG. 6 is a flow diagram generally representing example steps for controlling applications' transmit rates based on the current price and each application's willingness to pay in accordance with an aspect of the present invention.

By way of example, one way that the current price can be decreased is by multiplying the previous price by a factor less than one, such as 0.99. Similarly, the price can be increased by multiplying the previous price by a factor greater than one, such as 1.05. Note that the values need not be inverses of one another, such that the price can increase faster than it decreases (or vice versa). Further, note that many alternative formulas or schemes can be used to increase and decrease the price as desired, including those that do not use one or more threshold percentages. The formulas and factors described herein, however, have been found to be reasonable for adjusting the price in a manner that quickly influences transmit rates without radical price swings. Step 514 represents the newly calculated price being communicated (e.g., broadcast) onto the network 300. In this manner, the price is regularly adjusted and provided (e.g., ten times per second) to data sources based on the actual network load. Note that in alternative embodiments, the price may be irregularly adjusted, (e.g., the time intervals are irregular for some reason such as wireless issues), or continuously adjusted (e.g., on every packet, such as with a modem link). FIG. 6 represents the actions taken by the various components on a given machine (e.g., the machine 302) when the broadcast price data is received. Note that a process on the machine can poll to await updated price data, or alternatively, the steps of FIG. 6 can be executed automatically whenever new price data is received, e.g., like an event or interrupt. Step 600 represents the receiving of the price data. At step 602, one of the running applications is chosen to (potentially) adjust its packet output rate based on the new price. Step 604 tests whether the application is price controlled, that is, whether the application will ignore or comply with congestion pricing requirements. As described below, if not price-controlled, the rate of transmitting packets will equal a maximum possible rate, as represented by steps 604 and 606. Note that for non-price controlled applications, steps 604 and 606 can be integrated with step 602 such as by initially or by default setting the rate to the maximum for non-price controlled applications, and thereafter selecting only price controlled applications for adjusting their rate.

For price-controlled applications, the rate is adjusted based on the application's ability to pay. This is represented as a willingness value, set for the application by an administrator or the like, such as before the application is run. Step 608 represents the obtaining of the willingness value. Note that each application's willingness value may be changed as needed, for example, to temporarily give a payroll application a higher willingness value (and thus more bandwidth) when payroll is run (e.g. weekly). Similarly, certain code in an application may be given a higher willingness value than other code in the same application. Step 610 represents the calculation of the rate based on the willingness value divided by the current price:

rate=willingness/current price

Note that other formulas are possible. For example, to smooth the rate change, rather than dividing the willingness by the current price, the rate can be calculated by the change in rate divided by the formula:

$dr/dt = k(\text{willingness} - \text{rate} * \text{price})dt$ where k is a constant.

Step 612 uses the adjusted rate in association with the application, for example, by notifying the packet scheduler 418 to schedule X packets of the application (such as relative to the total number of packets that are pending). Step 614 then repeats the process to update the rates for other running applications.

As can be seen, the current price fluctuates based on actual measured load to determine the rate for price-controlled applications according to the willingness to pay value set for each controlled application. By setting the relative willingness values for all price-controlled applications in accordance with each application's importance and/or tolerance for delaying transmission of its packets, an administrator can give an application a commensurate share of the available bandwidth. Note that while such rate control could be done by a centralized mechanism (e.g., that knows or is told which applications are running and what their willingness is, and then calculates and transmits their allowed rates), it is generally more efficient to do so on each machine, as only the current price need be communicated.

The pricing model of the present invention provides another significant benefit, in that it provides for distinct types of classes, or priority levels for applications, by allowing certain applications (or certain code therein) to ignore price, essentially giving them infinite willingness to pay. Because such applications will not be rate controlled, they will not have their packets regulated and instead will obtain as much of the available bandwidth as they need. As long as the total bandwidth used by any such applications stays below the network capacity (preferably the threshold percentage), the needed bandwidth will be available for the non-price controlled application and none of its packets will be lost or delayed. At the same time, those applications that are rate controlled will essentially divide the remaining bandwidth not taken by the non-price controlled application or applications that are running.

As a refinement of the present invention, the various constants and thresholds that are used in the algorithms described may be adjusted dynamically to take account of the fraction of the network being used by non-price controlled applications. For example, the factor by which the price is increased if the threshold is exceeded may itself be increased if a fraction of the network is known to be used by such non-price controlled applications. Likewise, rate increases applied by the end-systems might have smoother adjustment factor.

By way of example of such a non-price controlled application, consider an application that plays a DVD movie on a home network. Such an application would be sensitive to lost packets or reductions in transmission rate, and thus that application typically would be allowed to send packets without having its rate adjusted by the current price. However, the packets of the movie application will still be counted in determining load, thereby influencing the price felt by other, price-controlled applications. This is significantly better than existing systems, because instead of having to unpredictably share the available bandwidth with other applications, and thereby risking occasional dropped packets when those other applications have a lot of data, the other applications will back off according to price, but not the non-price controlled application. In effect, because the preferred class ignores price, the non-preferred class has reduced network capacity available thereto. Note that variable bandwidth networks such as wireless, (with or without non-price controlled applications, either in whole or in part) provide a situation in which the present invention also may dynamically adjust the constants, factors, and algorithms described above to take account of changes in encoding rates used by different transmitters on the network. For example, if the observer is told that a particular node has halved its encoding rate (and hence doubled its capacity consumption) it may determine to make an immediate stepwise change in the price rather than adjusting it using a factor. It should be clear that with a wireless network and non-price controlled applications, very many adjustments may be made to the algorithms in the illustrative figures.

Figure 7:
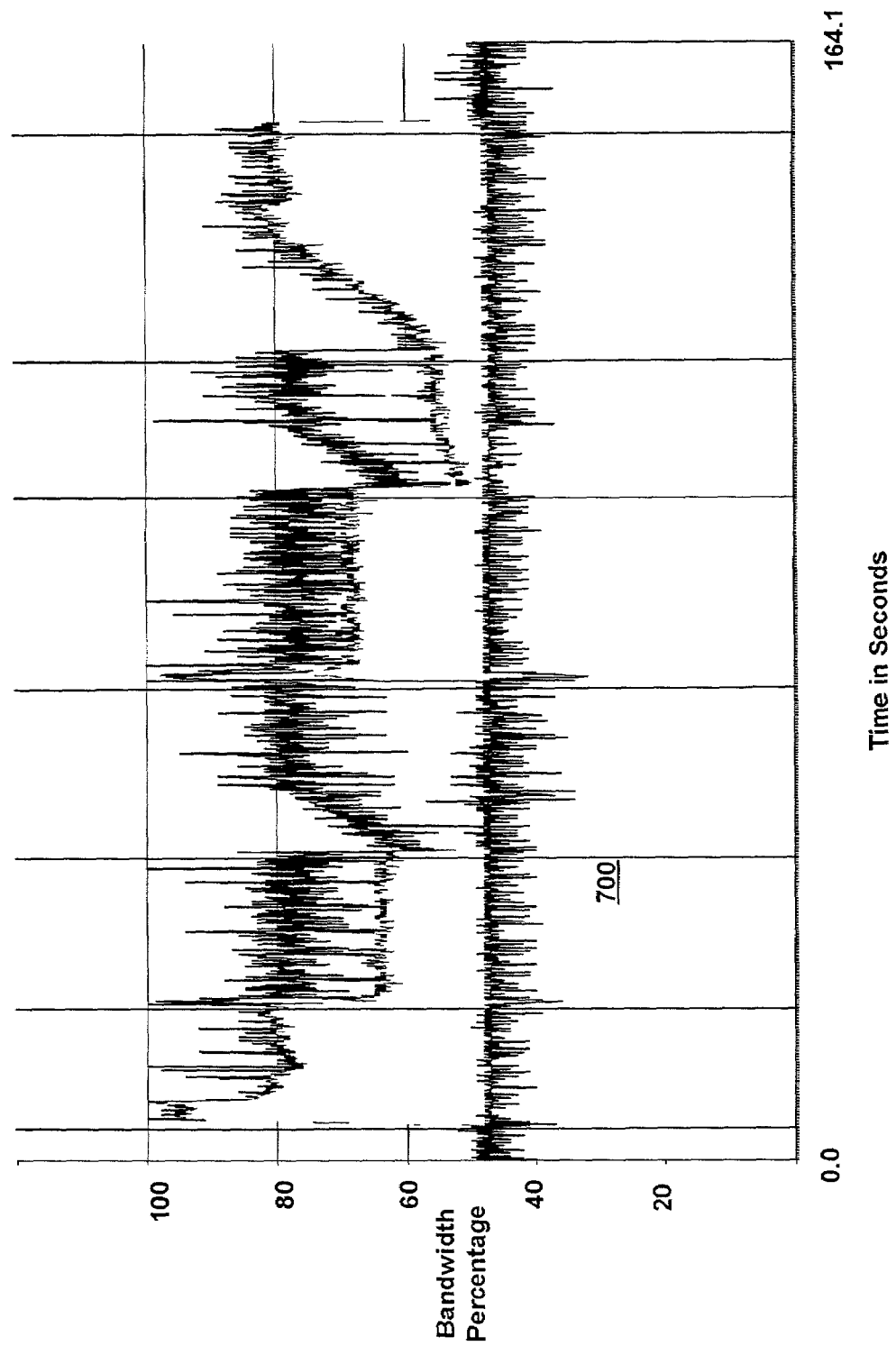
FIG. 7 is a graph generally representing the bandwidth consumed over time by two price-controlled applications and one non-price-controlled application in accordance with an aspect of the present invention.

By way of an overall general example, FIG. 7 shows a graph of the bandwidth taken by three running applications over time. One of the applications is not price-controlled, and its percentage bandwidth is relatively constant over time, shown in the graph by the area labeled 700. The other applications are price controlled, and their packet transmission rates are adjusted based on the price. As can be appreciated, the non-price controlled application gets what it needs and is essentially immune to the amount of packets that the other applications are sending. Those applications, rate controlled by price, adapt as needed to keep the load under full capacity.

Figure 8:
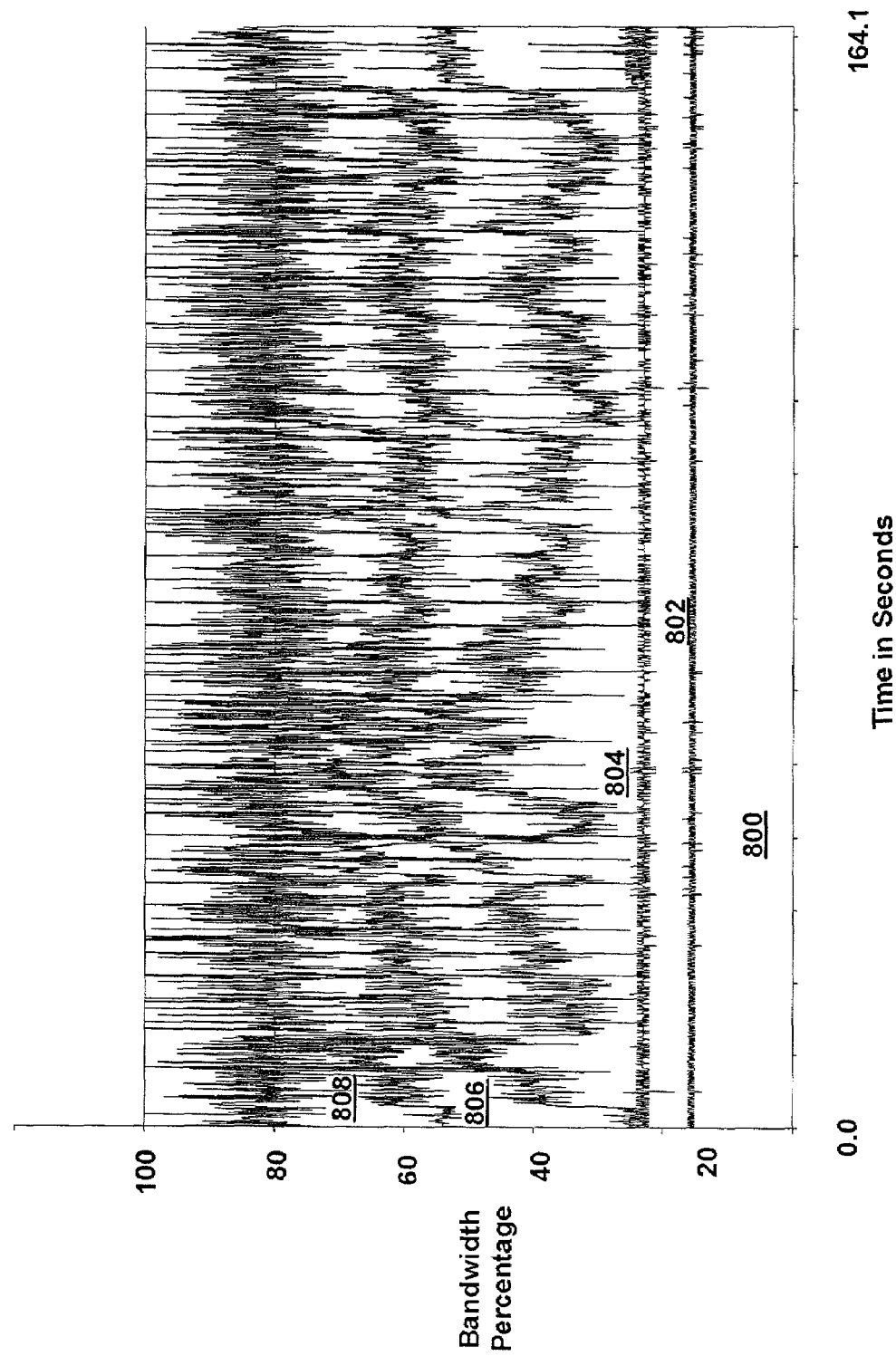
FIG. 8 is a graph generally representing the bandwidth consumed over time by three price-controlled applications and two non-price-controlled applications in accordance with an aspect of the present invention.

FIG. 8 provides a similar example, except that five running applications are being monitored, three of which are not price-controlled. As shown in FIG. 8, the non-price controlled applications have relatively constant percentage bandwidths over time, shown in the graph by the areas labeled 800 and 802. Moreover, the next flow up in the graph, generally labeled 804, is also non-price-controlled and corresponds to an application that provides relatively short bursts of packets instead of a more constant flow of packets. As seen in FIG. 8, the application that provides the flow 804 gets access to the network when it needs access, while price-controlled applications (with flows labeled 806 and 808) still share the (now rapidly varying) remaining bandwidth according to their willingness to pay values.

One alternative provides applications/flows which are partly price controlled and partly non-price controlled. For example, in layered video coding, which has a base quality and additional video improvement layers, the base quality can be guaranteed, with other layers sent in a price-controlled fashion. Indeed, each other layer can have a different willingness value assigned thereto, such as inversely proportional to its enhancement level.

Moreover, rather than rate controlling an application's packets per application, or per communication instance of that application, it is also possible and sometimes desirable to have an application have a non-rate-controlled (guaranteed) fraction of the available bandwidth plus an amount of bandwidth based on a willingness to pay value, in a communication instance. By way of example, consider a streaming media player application that needs a guaranteed amount of bandwidth in order to sufficiently transmit data to a buffer at the receiving end of the transmission so that streamed video or audio data is non-interrupted. However, before the application can play anything, the buffer needs to be pre-filled because some amount of data needs to be received to begin processing the data into the image or audio, e.g., at least the data that represents an initial video frame needs to be received in its entirety so that it can be decompressed and processed into the actual frame of pixels. In general, pre-filling creates an undesirable delay whenever it occurs, (e.g., at initial startup or following a "rewind").

To reduce the delay, with the present invention, an application may be arranged to have a transmit rate comprised of a fixed amount not controlled according to the price information, plus a rate based on the current price and the application's respective willingness to pay. As a result, the application is guaranteed to have sufficient bandwidth during normal streaming, but is further capable of requesting packets at a higher rate when pre-filling its buffer. The application will thereby more quickly fill its buffer when the network is not congested, with more delay when the network is more congested.

Whilst the present invention has been described in detail for several example networks (FIG. 2, FIG. 3A, FIG. 3B) in which certain aspects of the invention include support for networks with routers, for networks with only the receivers equipped with an implementation of the invention, for networks in which pricing signals can be broadcast, for networks in which a load can be observed directly by an observer node, and for combinations of the above, the present invention can also be implemented on other types of networks. As an example, consider further the description of FIG. 3B. As already described, each individual computer on the network regularly reports its current wireless transmit encoding rate to the observer node; it also simultaneously reports the number of bytes and packets that it transmitted. This allows the observer to work in a circumstance where for efficiency or necessity the observer does not directly observe all the transmitted packets; instead the observer calculates the network load indirectly by observing the reports from each computer. Thus a wireless network connected to wireless devices 314 has its load and capacity measured to establish a price so that demand is matched to capacity.

As another example, another similar aspect of the present invention is used in the case of a switched Ethernet segment.

In such a network broadcast and multicast packets traverse all the links of the network, whereas directed packets only traverse the link from the source to the switch and from the switch to the destination. This affects the load calculation required. The present invention operates by regarding each link to such an Ethernet switch as being a separate resource. The computer attached to the switch is observer for that link, and distributes the load and pricing information. If the link is a full-duplex Ethernet link then the link is handled as two resources (one from the computer to the switch, and one from the switch to the computer) and the corresponding two loads and prices are calculated and distributed. As already described, price information of all the resources used by an instance of communication are used together with its willingness to pay in order to calculate the rate for the communication. In the switched case that represents a minimum of two prices for any communication. In general, the present invention may be implemented on any networking technology by determining which network resources exist, and arranging an implementation to measure and price each such resource, and to distribute each such price.

CONCLUSION

As can be seen from the foregoing detailed description, there is provided a practical method and system for avoiding or eliminating network congestion via congestion pricing and congestion notification. The method and system are proactive in controlling congestion, applied fairly to applications based on their willingness to pay, enforceable, and do not require in-band packet marking schemes.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer network having a node and an observer, the node acting as a source of data transmissions and consuming network data transmission services, and the observer monitoring network load, a method of the node adjusting its service request, based on network load, to avoid data packets being dropped by the network so as to require retransmission of dropped data packets, the method comprising:
   at the node that requests data transmission services, obtaining price information for the data transmission services, the price being variable based on current network traffic relative to network capacity; and
   at the node that requests the data transmission services, and while transmitting the data, controlling a rate of transmitting data by the node over the network, the node generating the data as original data free of containing any retransmitted content, the controlling being based on the price information and on a weight value set by an administrator of the node, wherein the weight value corresponds to an assigned predetermined number associated with an operator of the node.

2. The method of claim 1 wherein obtaining price information includes receiving the price information from another computer system on the network.

3. The method of claim 2 wherein the other computer system on the network determines the price information by measuring the current network traffic as an amount of the network capacity which can be served with a congestion below a congestion threshold.

4. The method of claim 3 wherein the amount comprises a threshold value, and wherein the other computer system determines the price information by measuring the current network traffic, and increasing a previous price if the current network traffic relative to network capacity is greater than a threshold value, or decreasing the previous price if the current network traffic relative to network capacity is less than the threshold value.

5. The method of claim 4 wherein the other computer system on the network increases the previous price by multiplying the previous price by a first factor, and decreases the previous price by multiplying the previous price by a second factor.

6. The method of claim 2 wherein the other computer system broadcasts the price information.

7. The method of claim 2 wherein the other computer system periodically updates the price information.

8. The method of claim 1 wherein controlling a rate of transmitting data includes determining the rate based on the weight value divided by the price information.

9. The method of claim 1 wherein controlling a rate of transmitting data includes, obtaining the weight value for a selected application, and controlling the transmit rate for the selected application based on that weight value and the price information.

10. The method of claim 1 wherein controlling a rate of transmitting data includes, obtaining the weight value for each of a plurality of selected applications, and for each application, controlling the transmit rate based on the application's respective weight value and the price information.

11. The method of claim 10 wherein at least one other application does not have its transmit rate controlled according to the price information.

12. The method of claim 10 wherein at least one application has its transmit rate comprised of a fixed amount not controlled according to the price information, and a rate based on the price and the application's respective weight value.

13. The method of claim 12 wherein the price information being determined is based on an amount of the network capacity being used by at least one application whose rate at least in part is not controlled according to price information.

14. The method of claim 13 wherein a rate adjustment is smoothed based on the amount of the network capacity being used by at least one application whose rate at least in part is not controlled according to price information.

15. In a computer network, a system for controlling a rate of data transmission by a node to a destination such that data packets are not dropped and required to be retransmitted, system comprising,
   an observer mechanism that determines network demand;
   a pricing mechanism configured to determine a price which is variable based on the network demand and network capacity data, the pricing mechanism further being configured to provide price information corresponding to the price to at least a node on the network, the node requesting data transmission services and acting as a source of originally generated data packets free of retransmitted content; and
   a rate control mechanism at the node, the rate control mechanism being configured to receive the price information and to control a transmit rate of the data packets based on the received price information and based on a weight value set by an administrator of the node.

16. The system of claim 15 wherein the observer mechanism is incorporated into a computing device on the network.

17. The system of claim 16 wherein the computing device comprises a router.

18. The system of claim 16 wherein the computing device comprises a gateway.

19. The system of claim 16 wherein the pricing mechanism is incorporated into the same computing device as the observer.

20. The system of claim 15 wherein the pricing mechanism provides price information by broadcasting the price information on the network.

21. The system of claim 20 wherein the pricing mechanism provides the price information at periodic intervals.

22. The system of claim 15 wherein the pricing mechanism determines price information by dividing a value representative of the network demand by the network capacity data.

23. The system of claim 22 wherein the network capacity data comprises a fixed value.

24. The system of claim 22 wherein the network capacity is not constant.

25. The system of claim 22 wherein the value representative of the network demand comprises a number of bytes of network traffic per unit time.

26. The system of claim 25 wherein the number of bytes includes packet overhead.

27. The system of claim 15 further comprising an application program executing at the node, and wherein the rate control mechanism controls a transmit rate for the application based on a weight value associated with the application program and the received price information, wherein the weight value associated with the application program corresponds to an assigned predetermined number associated with an operator of the node.

28. The system of claim 27 further comprising at least one other application that does not have its transmit rate controlled by the rate control mechanism.

29. The system of claim 27 wherein at least one application has its transmit rate comprised of a fixed amount not controlled according to the price information, and a rate based on the price and the application's respective weight value.

30. The system of claim 29 wherein the price information being determined is based on an amount of the network capacity being used by at least one application whose rate at least in part is not controlled according to price information.

31. The system of claim 30 wherein a rate adjustment is smoothed based on the amount of the network capacity being used by at least one application whose rate at least in part is not controlled according to price information.

32. The system of claim 27 wherein the pricing mechanism determines the price information by comparing the network demand to a threshold value, and if the network demand achieves the threshold value, increasing a previous price, and if not, decreasing the previous price.

33. The system of claim 15 wherein the rate control mechanism comprises protocol code implemented at the Internet Protocol (IP) layer.

34. The system of claim 15 wherein the rate control mechanism controls the at least one transmit rate by controlling a rate of acknowledging packet receipt.

35. A computer-implemented method for avoiding data packets being dropped over a network connection in which a node requests data transmission services in transmitting data packets to a destination computer, the computer-implemented method comprising:
receiving a plurality of packets transmitted on a network during a period of time;
determining a network demand value based on an accumulated size of the packets received during the period of time and a network capacity value;
determining a price value based on the network demand value relative to a threshold, wherein the price value is variable based on the network demand;
providing the price value to a node computer operable to generate original packets free of retransmitted content on the network; and
at the node computer that requests data transmission services, and while the node computer transmits data packets, controlling a rate of transmitting data packets on the network based on the price value and based on a weight value set by an administrator of the node computer.

36. The method of claim 35 wherein receiving a plurality of packets includes operating a computing device in a mode that is intended to receive all packets transmitted on the network.

37. The method of claim 35 wherein determining a network demand value comprises calculating a current percentage of the network capacity in use.

38. The method of claim 35 wherein determining a price value comprises increasing a previous price if the threshold is achieved, else decreasing the price.

39. The method of claim 35 wherein providing the price value comprises broadcasting price information on the network.

40. The method of claim 35 wherein controlling the rate of transmitting data packets comprises, selecting an application program, obtaining a weight value associated with the application program, and controlling the rate based on the weight value and the price value, wherein the weight value corresponds to an assigned predetermined number associated with an operator of the node computer.

41. The method of claim 35 further comprising acknowledging the receipt of the received packets and wherein controlling a rate of transmitting data packets on the network comprises controlling a rate of acknowledging the receipt of data packets by a destination computer.

42. A computer-implemented method for adjusting a service request of a node computer, based on current network load, to avoid data packets being dropped over a network, the computer-implemented method comprising:
receiving load information corresponding to network load at a destination of network packets, wherein the network load information is variable as determined by network traffic; and
at a node computer that requests data transmission services by generating network packets free of retransmitted content, and while the node computer transmits the network packets, controlling a rate of a flow of packets from the source to the destination based on the load information and a weight value associated with the flow, wherein the weight value is set by an administrator of the node computer.

43. The method of claim 42 wherein controlling a rate of a flow of packets to the destination comprises controlling a rate of acknowledging packets received from the source.

* * * * *